US009098371B2

(12) United States Patent
Cordesses et al.

(10) Patent No.: US 9,098,371 B2
(45) Date of Patent: Aug. 4, 2015

(54) METHOD AND SYSTEM FOR DEPLOYING NON-BACKWARD COMPATIBLE SERVER VERSIONS IN A CLIENT/SERVER COMPUTING ENVIRONMENT

(75) Inventors: Joël Cordesses, Antibes (FR); Stéphane Monbel, Nice (FR); Pierre Dor, Vence (FR); Christophe Tcheng, Valbonne (FR)

(73) Assignee: Amadeus S.A.S., Biot (FR)

( * ) Notice: Subject to any disclaimer, the term of this patent is extended or adjusted under 35 U.S.C. 154(b) by 1193 days.

(21) Appl. No.: 12/863,641

(22) PCT Filed: Jan. 16, 2009

(86) PCT No.: PCT/EP2009/050471
§ 371 (c)(1),
(2), (4) Date: Feb. 10, 2011

(87) PCT Pub. No.: WO2009/092666
PCT Pub. Date: Jul. 30, 2009

(65) Prior Publication Data
US 2011/0185348 A1 Jul. 28, 2011

Related U.S. Application Data

(60) Provisional application No. 61/022,834, filed on Jan. 23, 2008.

(30) Foreign Application Priority Data

Jan. 22, 2008 (EP) .................................... 08300042

(51) Int. Cl.
*G06F 9/44* (2006.01)
*G06F 9/445* (2006.01)
(52) U.S. Cl.
CPC .............. *G06F 8/65* (2013.01); *G06F 9/44536* (2013.01)

(58) Field of Classification Search
USPC ........................................................ 717/170
See application file for complete search history.

(56) References Cited

U.S. PATENT DOCUMENTS 5,732,275 A * 3/1998 Kullick et al. ................ 717/170
6,113,652 A * 9/2000 Lysik et al. ................... 717/170

(Continued)

FOREIGN PATENT DOCUMENTS

CN 1545363 A 11/2004
JP 2007286790 A 11/2007

(Continued)

OTHER PUBLICATIONS

Official Action received in corresponding Chinese Application No. 200980102667.X, dated Aug. 31, 2012, English translation and original Chinese language document (18 pages).
Office Action issued in Japanese Patent Application No. 2010-542632 dated Feb. 14, 2013.

(Continued)

*Primary Examiner* — Li B Zhen
*Assistant Examiner* — Sen Chen
(74) *Attorney, Agent, or Firm* — Thompson Hine LLP

(57) ABSTRACT

A method and a system for managing the introduction of a new non-backward compatible version of an application server into a client/server networking, the method includes first distributing to a client system to be served by the new non-backward compatible version of the application server a client application operable in a mode compatible with the current version of the application server and in a mode compatible with the new non-backward compatible version. Upon installation in the client system the client application is set into a downgraded mode compatible with the current version of the application server. While the current version of the application server is still in production, the client application is kept operated in the downgraded mode. Upon introduction of the new non-backward compatible version of the application server, the client application is set into a valid mode compatible with the new version of the application server. From that point on, the client application is operated in the valid mode.

20 Claims, 4 Drawing Sheets

(56) References Cited

U.S. PATENT DOCUMENTS

| | | | |
|---|---|---|---|
| 6,343,328 B1* | 1/2002 | Murphy et al. | 709/246 |
| 6,754,848 B1* | 6/2004 | Froehlich et al. | 714/28 |
| 6,950,847 B2* | 9/2005 | Harrisville-Wolff et al. | 709/201 |
| 7,606,836 B2* | 10/2009 | Lambert et al. | 1/1 |
| 7,792,522 B1* | 9/2010 | Bussey et al. | 455/418 |
| 2002/0078262 A1* | 6/2002 | Harrison et al. | 709/331 |
| 2005/0108706 A1* | 5/2005 | McCain | 717/177 |
| 2005/0132032 A1* | 6/2005 | Bertrand | 709/223 |
| 2007/0244905 A1 | 10/2007 | Ito et al. | |
| 2010/0115432 A1* | 5/2010 | Arthurs et al. | 715/760 |

FOREIGN PATENT DOCUMENTS

| | | |
|---|---|---|
| WO | 00/68836 A2 | 11/2000 |
| WO | 01/69382 A1 | 9/2001 |
| WO | 02/48878 A2 | 6/2002 |

OTHER PUBLICATIONS

International Search Report, dated May 4, 2009, from corresponding PCT application.

Examination Report for European Application No. 09,704,579.3 dated Aug. 22, 2013.

* cited by examiner

METHOD AND SYSTEM FOR DEPLOYING NON-BACKWARD COMPATIBLE SERVER VERSIONS IN A CLIENT/SERVER COMPUTING ENVIRONMENT

FIELD OF THE INVENTION

The present invention relates generally to computer systems in a client/server environment and more specifically to the deployment of new versions of server software applications that need not to be backward compatible with client versions.

BACKGROUND OF THE INVENTION

The client/server computing model implemented over a network has been universally adopted. In this model, requests issued by the software applications of client nodes are sent to one or more connected servers. Once processed by the server the requested information is returned to the clients. This model is the one of the Internet where clients are web browsers and servers are web servers including many specialized servers such as the mail servers.

This model is also the one of many service providers generally operating large computing resources to serve a community of clients, end-users of the software applications running on the computing resources of the service provider, possibly over a mix of private and public networks including the Internet. Examples of such providers are the global distribution systems (GDSs) providing travel services to the whole travel industry including airlines, traditional and online travel agencies (e.g., for travel planning and reservation) and airports (e.g., for departure control and passengers check-in).

Software systems in general are frequently updated over their life cycle. Even after completion of the development phase, when systems are in production, the software applications continue to evolve to apply corrections and improve them with the addition of new features. Also, changes may have to be brought in order to fully take advantage of the performances of a new type of machine or because the operating system is new, has evolved or is different.

In the client/server model, to roll out a new version of server side application, the standard practice is that new version must be backward compatible. Hence, whichever version of the client application is in use at any node, the new server, once deployed is immediately able to handle the client requests and deliver the requested information in a compatible format.

This ideal scheme applies, to some extent, to the Internet where web servers need to be compatible with all the existing web browsers used by innumerable clients of the world-wide public network. This is not completely true though. It is well known that not all web browser brands react exactly in the same way and that many servers are supporting in practice only the most recent versions of the client applications. For example, with Internet Explorer (IE), the web browser by Microsoft Corporation, the most used browser world-wide, many recent server applications currently support only version 5 (IE5) and above. Indeed, client graphic user interface (GUI) may be seriously impaired when browser older versions, or browser brands that are not supported, request and receive information from an upgraded server.

Maintaining backward compatibility, even though it is only partially achievable in practice, has a high cost. Server new application must cope in one way or another with all the options, features, incompatibilities and flaws of all the client versions to be supported in the field. This has a high cost during the development phase requiring more time and skills to develop the new server application and possibly requiring more memory and faster hardware resources to be implemented. Even more importantly, the number of server/client browser combinations to check is growing rapidly up to a point where testing phase may require an impossible amount of resources (machines and manpower) to put in place to allow an exhaustive testing of all the combinations within a reasonable amount of time.

Above is true even though a web browser is said to be a 'thin client', i.e., a client actually performing only a limited share of the work to be done between server application and client application to have requested job done. Indeed the prime task of a web browser is to display the pages returned by the web server through a GUI.

With the client/server systems that are not publicly accessible, like the GDSs mentioned above, which generally work only with affiliated clients (e.g., airlines, travel agencies, airports, etc.) the client application may rather need to be a so-called 'rich client' that has to perform a much greater part of the whole work to be shared between server and client. This may be required because the available bandwidth between them is too limited to allow client application soliciting the server for each task to be done. With GDSs this is for example the case of client application systems used in airports for controlling plane departure and check-in of the passengers, a work that must be expedited in a rush time when passengers are boarding. Indeed, small airports may still have limited external communication resources. Also, airport computing resources are owned and under the control of the airport authorities requiring approval, thus time, to be deployed and updated even though the check-in application is used by the airlines affiliated to the GDS.

Hence, when client application is a rich client, devised to perform itself a larger share of the work, the problem of having backward compatible servers may even be more difficult, if not impossible, to achieve than with a thin client. Indeed, the number of options and features of all the versions of the rich client applications to be supported is potentially much larger thus greatly exacerbating the problems mentioned above regarding development and testing phases of the server application.

U.S. Pat. No. 5,732,275 discloses a method and apparatus for managing and automatically updating software programs. This document does not address the problem of adapting all the client software applications of a network prior to the deployment of a new non-backward compatible version of a server software application. According to this prior art, it is assumed that the client application is self-capable of downloading a software version from a shared memory. This restricts the scope of application of this technology whereas the present invention can apply to a network including pretty dumb terminals with limited software resources.

WO01/69382A discloses a method for initial configuration of a client device. According to this publication, a new template is downloaded to initially configure the client application. This template is intended to adapt the client application to a new format of data organization of the server and not to a new version of the server software application itself.

In view of the above it is thus desirable to allow, in a client/server environment, a deployment of new versions of server applications that need not to be backward compatible.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The above-mentioned difficulties of having to deploy backward compatible servers in a client/server environment are addressed by the present invention which describes a method and a system for managing the introduction of a new non-backward compatible version of a software program of an application server into a client/server networking environment. The method consists in first distributing to a client system to be served by the new non-backward compatible version of the software program of the application server a client application operable in a mode compatible with the current version of the application server and in a mode compatible with the new non-backward compatible version. Upon installation in the client system the client application is set into a downgraded mode compatible with the current version of the application server. While the current version of the application server is still in production, the client application is kept operated in the downgraded mode. Upon introduction of the new non-backward compatible version of the application server, the client application is set into a valid mode compatible with the new version of the application server. From that point on, the client application is operated in the valid mode. Setting of the modes is automatically triggered at each re-launch of the client system which queries a version server operating in the client/server networking environment. Query include an identification of the client system and a client application version number in order to obtain from the queried version server a status value to operate the client system into a mode including the downgraded mode and the valid mode.

According to additional but purely optional embodiments of the invention, the method is such that:

setting steps are automatically triggered at each re-launch of the client system further including the steps of:

querying a version server operating in the client/server networking environment, the query including an identification of the client system further including a client application version number;

obtaining from the queried version server a status value to operate the client system into a mode including the downgraded mode and the valid mode.

query further includes geographical location, user identification and all sorts of information on the client system to establish statistics.

query contents is stored in a database of the version server.

re-launch of the client system is forced by the service provider operating the application server when the new non-backward compatible version of the software program of the application server is put in production.

re-launch of the client system is forced automatically when the new non-backward compatible version of the software program of the application server is loaded.

re-launch of the client system is forced automatically in case of fallback on a previous version.

the client application receives from the version server the status value to operate the client system in an invalid mode.

the obtaining step includes, in version server, the prior step of:

checking the client application version number against a meta-rule to immediately declare invalid client application older than what meta-rule specifies.

it includes, if meta-rule check is successful, the further steps of:

checking the client application version number against a set of compatibility rules;

declaring invalid, deprecated or downgraded the client application concerned by the compatibility rules according to rule contents; otherwise, declaring valid the client application not concerned by any compatibility rules.

the obtaining step further delivers to the client system a patch to correct one or more client application problems.

the patch is dynamically applied each time the client system is re-launched.

the client application includes a graphic user interface.

The invention also relates to a system for managing the introduction of a new non-backward compatible version of a software program of an application server into a client/server networking environment including a version server and a database comprising means adapted for carrying out each step of the method.

The invention also concerns a computer program product stored on a computer readable storage medium, comprising computer readable code means for causing at least one computer to operate the method for managing the introduction of a new non-backward compatible version of a software program of an application server into a client/server networking environment

BRIEF DESCRIPTION OF THE DRAWINGS

FIG. 3 discusses how version server manages to attribute a status to a client system having issued a query at log-in.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

Figure 1:
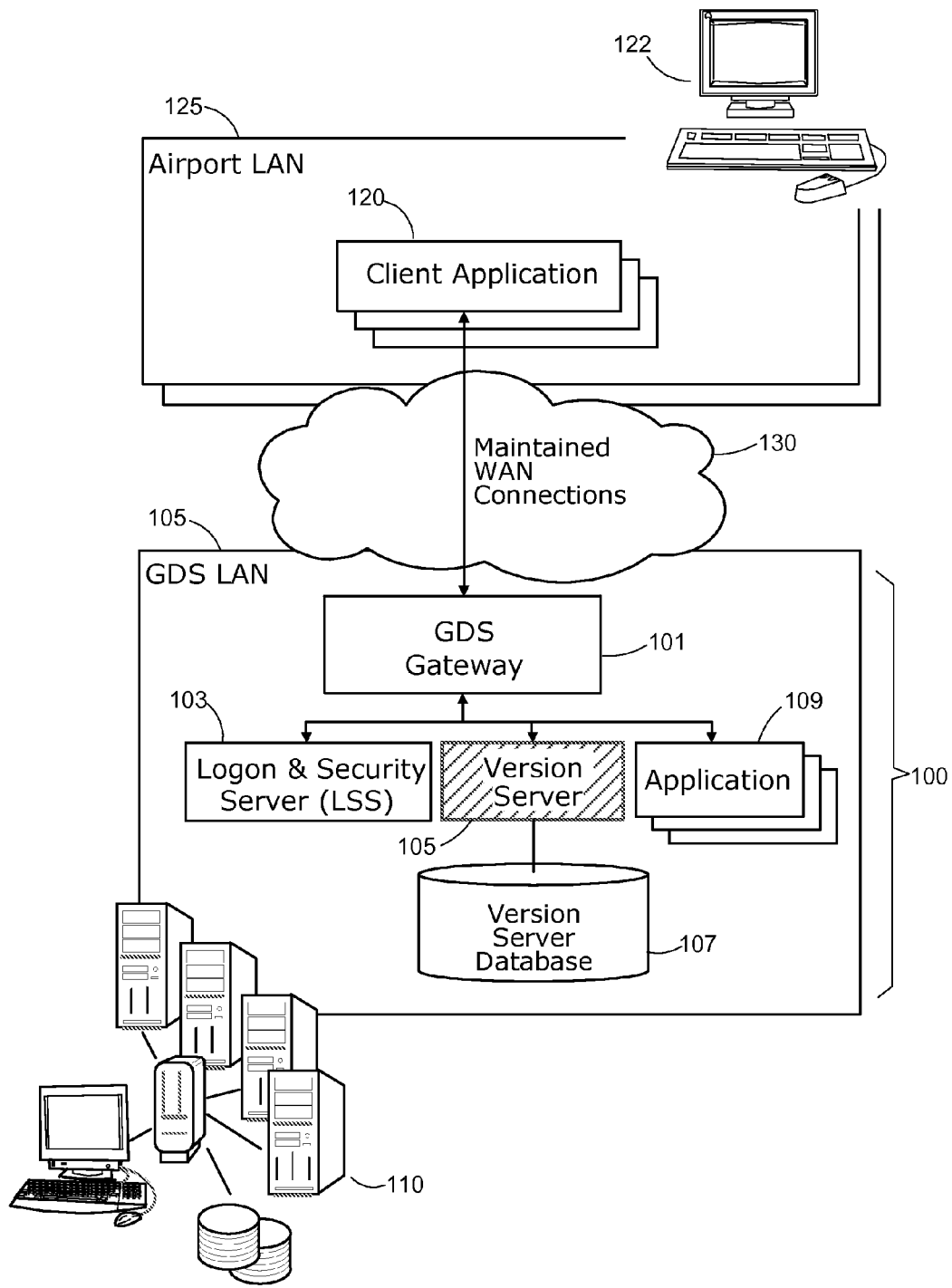
FIG. 1 describes an exemplary system according to the invention based on a GDS including a version server and a database.

FIG. 1 describes an exemplary system according to the invention based on a GDS (100) as discussed in the background section. GDS or any equivalent system providing services over a network in a client/server environment implements servers, generally from large computing resources (110), to support a multiplicity of remotely located client applications (120) (that is software applications running at the level of the clients) and systems (122). In this particular example used to illustrate the invention client system is an airport departure control system (DCS) used, e.g., when passengers are boarding planes. Connections are maintained (130) between servers and clients over a wide area network (WAN) possibly comprised of any combination of private and public network including the Internet. Computing resources are, e.g., all interconnected with a private local area network or LAN (105). Similarly, a local set of client applications can be interconnected trough a LAN, e.g., an airport LAN (125)

while independent sets of client applications communicate with GDS through the WAN (130). Interfacing with client applications is performed in this example through a gateway (101) allowing clients to access all the applications (109) provided by the GDS including the DCS application mentioned here above. Such a system typically includes a logon and security server or LSS (103) aimed at checking that client applications that attempt to connect are legitimate and can provide the expected credentials to be authorized to work with any of the supported applications (109).

In the present description, the software program of the application server means the software resources used at the level of the application server to perform its functions. Unless explicitly indicated the terms "software program of the application program of the application server" are hereafter sometimes shortened in the expression "application server". Indeed, even if the servers comprise hardware components, the subject of the invention is to manage versions of software components.

The invention introduces a version server (105) working in conjunction with a database (107). As explained in detail in the following description the role of the version server is to keep track of all the client application versions (120) present in the field. Typically, a GDS and equivalent systems (100) are made able to interface thousands of remote client applications (120) over a world-wide WAN (130). Client characteristics are stored in the database from where they are retrieved by the version server when necessary.

When server backward compatibility is not possible or would be much too expensive the method of the invention consists in first deploying to all remote client nodes an upgraded version of the client application and GUI. This implies that the new version of the client application is made compatible both with current version of the server and with newer version, i.e., the one to come. With such a scheme the new server will need not to be compatible with older client applications and GUIs when installed.

As a consequence of the above strategy, during the deployment phase (a full deployment may typically require several weeks to complete in a network comprising thousands of client nodes), the new client application, when installed, is downgraded to server version N, i.e., to the current version in production. Its status is changed accordingly in the database (107) of the version server (105) to 'downgraded to version N'. Hence, during the interim period while client application is deployed in client nodes, those of the nodes that have been already upgraded are using systematically, i.e., each time client is re-launched, the version N compatible with current server.

Once distribution is complete or is near completion the server system, e.g., the GDS (100) of FIG. 1 can decide to promote the new server so that all or at least a majority of end-users can start taking advantage of the upgraded client/server functions and features. Promotion can be done manually by an administrator of the system, or can be triggered automatically at the time of the software load. In this case, version server is instructed to change the status of the remote client nodes to 'valid' in the database so that the next version of the server (N+1) can be put in production and have client application and GUI operate at level N+1 too. To achieve this, version server forces the disconnection of all the sessions using version N (and older versions if any). To this end a sign-out message is forwarded by the version server to each client remote node to end the user sessions and request re-launching of the client application and GUI. Then, at next re-launch, version N+1 is automatically used as further discussed in the following description of the invention. It should be noticed here that GDS service provider system has the freedom of controlling through the version server as few or as many client nodes as necessary. Only the client nodes concerned by a particular upgrade need to be re-launched. Upgrades, downgrades (e.g., in case of fallback on a previous version) and version blocking (if current version is incompatible) can be performed at various very different level of granularity. This may range from the whole world, a region, a country, a city, an airport down to any identifiable location such as a specific terminal in an airport, a boarding gate, an office, etc., thus providing a great deal of flexibility in the deployment of new client versions.

Figure 2:
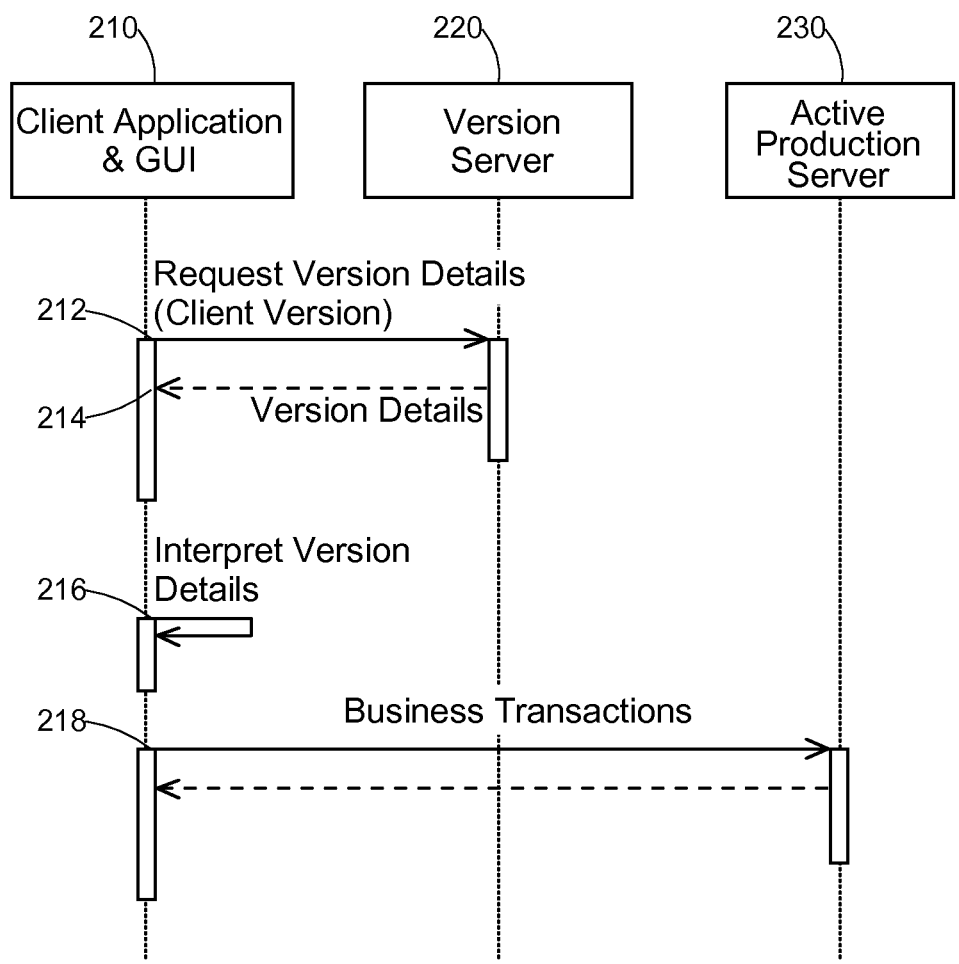
FIG. 2 is a high-level view of the major steps of the method in a client node to decide how client application and GUI must operate depending on the server version in production.

FIG. 2 describes the major steps of the method in a client node to decide how client application and GUI must operate depending on the server version in production.

Process is executed each time client application (210) is re-launched. A transaction is automatically initiated (212) by client application at log-in to retrieve from the version server and database (220) the details of the client application version to be used (214). The query automatically sent by client application to version server needs to contain identification (ID) of the client node including application ID in use and its version number.

In a preferred embodiment of the invention, to establish statistics on the use of the client application versions and progress of the deployment of a new version, query should contain more information about client node including:

user identification;

user office, e.g.: LONLH033 for a Lufthansa (LH) agent located in London;

user location, e.g.: LHR/T2/GTE/20 for London Heathrow airport, terminal 2 at gate 20;

user organization, e.g.: LH, the airline company name;

etc.

Information which is anyway provided to the logon and security server (LSS) shown in FIG. 1 (103) as part of the credentials to be provided so that to be recognized as a legitimate user of the application server.

What is provided in the query (212) by the client application can thus be used to obtain invaluable information on the deployment of a new application version in the field and, generally, on the characteristics of the population of client applications interfacing with the application servers. For example, GDS can establish a list of locations in the world using a certain version of client application or can detect where too old versions are still in use. Information provided by the client application is gathered in the database and can be exploited by any kind of program run from an administrative center in charge of watching and managing a large population of remote client nodes.

Version server (220) keeps managing a status list of client application and GUI's in use in all client nodes. Then, knowing the version of the application server currently in production and, as explained above, on the basis of the information provided by the client nodes in the queries a status is returned (214) to each client system at log-in time. Status can take one of the following values:

| | |
|---|---|
| Valid: | is the status of the latest downloaded version (N + 1) of the client application and GUI. This the normal status after a new client application has been deployed and corresponding new version of the server has been put in production. |

| | |
|---|---|
| Deprecated: | says that client application and GUI is an older version yet compatible with current production server. This status is used when a new version of the GUI is available but older deployed GUI remains however compatible with current server. Depending on client configuration a warning message is optionally displayed to end-user at log-in. |
| Downgraded to version N: | indicates that newly deployed client application and GUI version N + 1 must behave as version N (while a new client application and GUI is being distributed, before activating the corresponding new server). As discussed above this status is mainly used to allow managing the activation of non-backward compatible servers. It is also occasionally used to manage fallback of a server (to a previous version) as explained hereafter. |
| Invalid: | says that client application and GUI is an old version NOT compatible with current production server. End-user of client node receives a warning notice at log-in and is normally blocked. |

The above status values are interpreted by the client systems (216) so as to behave according to the version of the application server in production. After which normal transactions (218) can take place between client applications and the application server (230) in charge of handling them.

If, for any reason, an application server that has been promoted encounters a problem and must be removed, fallback on a previous version must occur. Then, new client application and GUI that were already downloaded must be set back to the 'downgraded' status so that they start again to behave, as in the interim period while deployment was in progress, in accord with the previous server version. If some client systems were still using the previous version of the client application and GUI their status is reversed from 'deprecated' to 'valid'.

Figure 3:
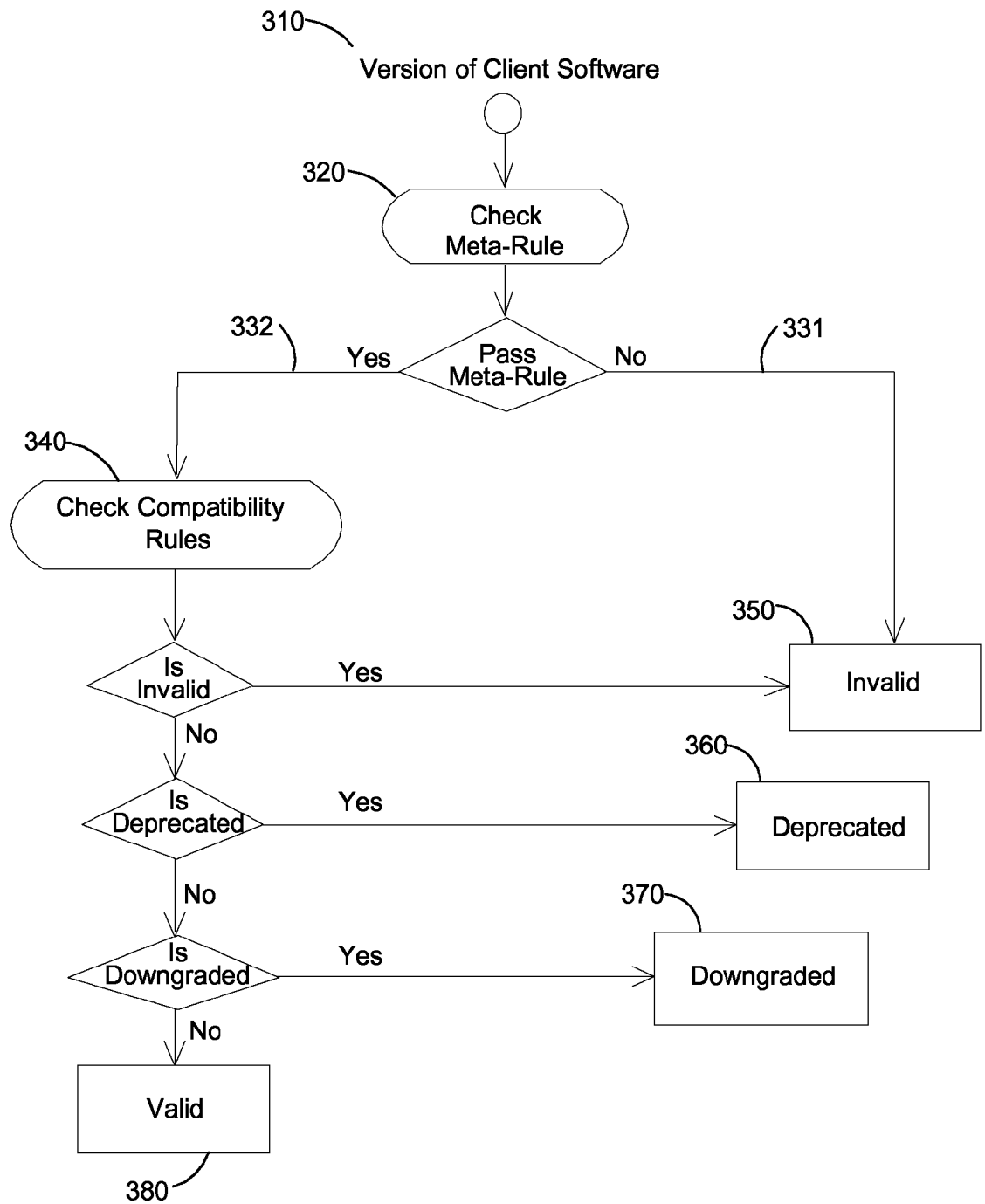

FIG. 3 discusses how version server manages to attribute a status to a client system having issued a query at log-in.

The process starts with the version (310) of the client application and GUI provided in the query issued to the version server by the client system. To decide on which status is to be returned when interrogated by a client system version server uses compatibility rules that are each checked (340) against the provided client version (310), knowing which version of the application server is in production. However, to avoid having a proliferation of compatibility rules there is a prior check of client version against a meta-rule (320). Meta-rule is used to eliminate directly all version numbers that are older than a given value. There is one meta-rule per client application. Hence, if check of meta-rule fails (331) the 'invalid status' is directly returned (352). Otherwise, if client version passes meta-rule check (332) the compatibility rules need to be checked (340). The compatibility rules actually keep track of all the situations where there is incompatibility between server in production and specific client systems so that all those not concerned by the rules are finally declared valid (380). Otherwise, client systems that are concerned by the rules are declared to be 'invalid' (350), 'deprecated' (360) or 'downgraded' (370) according to the rule contents that apply to them.

Figure 4:
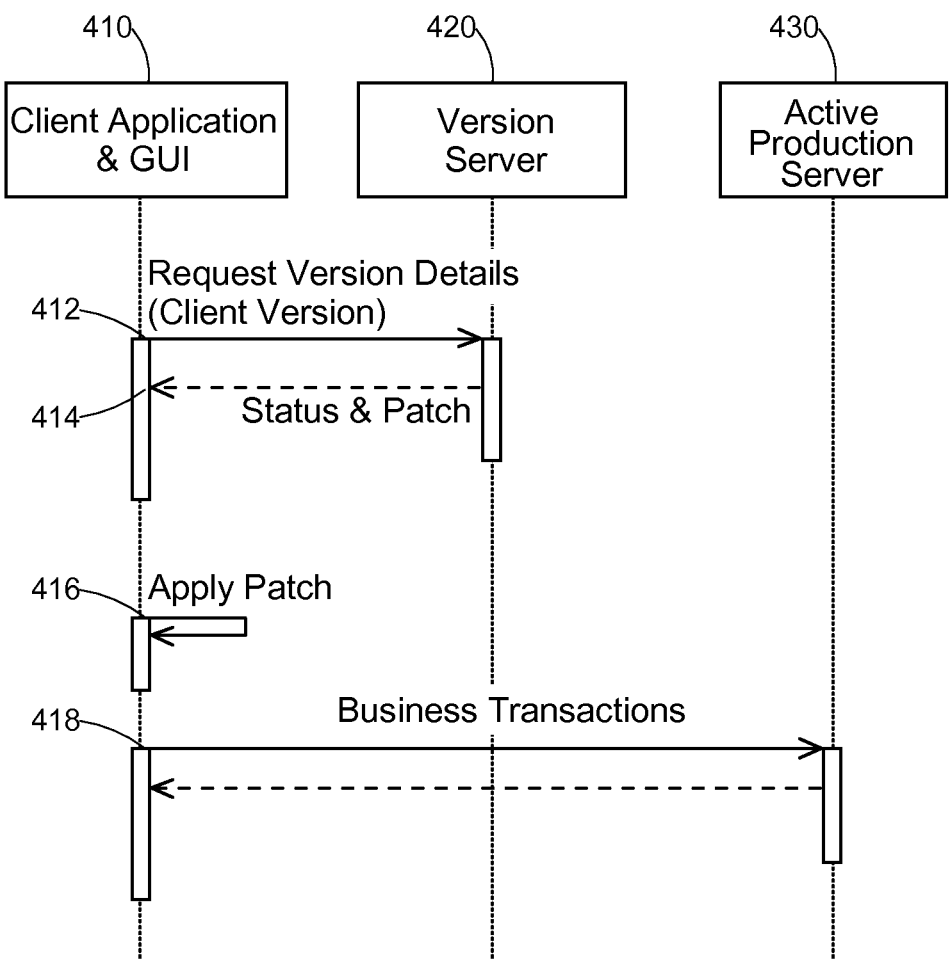
FIG. 4 describes online patching of a client system, a functional enhancement brought by the use of a version server.

FIG. 4 describes online patching of a client system, a functional enhancement brought by the use of a version server.

The use of a version server is particularly useful in large networks involving numerous client systems possibly concerning thousands or tenths of thousands of client nodes. Then, the deployment of a new client application is a burdensome and long task that typically takes weeks to complete. Because remote sites may not be under the direct control of the service provider, e.g., the GDS used to illustrate the invention, those in charge, e.g., airport authorities, might be indeed reluctant to install a new version of application for fear of adversely impacting their system. The fallback mechanism supported by the invention is one answer to this concern allowing in case of serious problem to come back to a previous version of the server. A version server according to the invention allows implementing a further functional enhancement to bypass a problem that would be found while deployment of client application is in progress or any time after it has been activated.

If a major blocking problem is discovered in a client application version (410) that has already been world-wide deployed, version server (420) can provide a piece of code, a patch, to get around the problem without having to redistribute the whole client application. To do this, as already explained in FIG. 2, when version server answers query (412) automatically sent at log-in of a remote client system a patch is added in the response. On the basis of the version number and application name provided in the query, version server recognizes that client application version has a functional problem. Then, reply forwarded by the version server includes a status, already discussed, and a patch of the functional problem (414). On reception of the server reply client application changes its behavior according to the version status and applies the patch on itself (416). The patch is neither permanently stored nor installed on the client application machine but rather applied each time the client application is restarted. After which normal transactions (418) can resume between client applications and the application server (430) in charge of handling them. This mode of operation goes on until a new version is redistributed.

The invention claimed is:

1. A method for managing the introduction of a new non-backward compatible version of a software program of an application server into a client/server networking environment, the method comprising:
   first distributing to a client system to be served by the new non-backward compatible version of the software program of the application server a client application operable in a downgraded mode compatible with a current version of the application server and in a valid mode compatible with the new non-backward compatible version of said software program;
   setting, upon installation in the client system, the client application into the downgraded mode compatible with the current version of the software program of the application server;
   operating the client application in the downgraded mode until introduction of the new non-backward compatible version of the software program of the application server, wherein operating the client application in the downgraded mode includes issuing requests to the application server and receiving requested information from the application server;
   setting, upon introduction of the new non-backward compatible version of the software program of the application server, the client application into the valid mode compatible with the new version of the software program of the application server; and
   thereafter operating the client application in the valid mode, wherein operating the client application in the valid mode includes issuing requests to the application server and receiving requested information from the application server.

2. The method of claim 1 wherein setting steps are automatically triggered at each re-launch of the client system further including the steps of:

querying a version server operating in the client/server networking environment, the query including an identification of the client system further including a client application version number;

obtaining from the queried version server a status value to operate the client system into a mode selected from the downgraded mode and the valid mode.

3. The method of claim 2 wherein the query further includes geographical location, user identification and information about the client system to establish statistics.

4. The method of claim 3 wherein query contents are stored in a database of the version server.

5. The method of claim 2 wherein re-launch of the client system is forced by the service provider operating the application server when the new non-backward compatible version of the software program of the application server is put in production.

6. The method of claim 5 wherein re-launch of the client system is forced automatically when the new non-backward compatible version of the software program of the application server is loaded.

7. The method of claim 5 wherein re-launch of the client system is forced automatically in case of fallback on a previous version.

8. The method of claim 2 wherein the client application receives from the version server the status value to operate the client system in an invalid mode.

9. The method of claim 2 wherein the obtaining step includes, in version server, the prior step of: checking the client application version number against a meta-rule to immediately declare invalid client application older than what meta-rule specifies.

10. The method of claim 9 including, if the meta-rule check is successful, the further steps of:
checking the client application version number against a set of compatibility rules;
declaring invalid, deprecated or downgraded the client application concerned by the compatibility rules according to rule contents;
otherwise, declaring valid the client application not concerned by any compatibility rules.

11. The method of claim 2 wherein the obtaining step further delivers to the client system a patch to correct one or more client application problems.

12. The method of claim 11 wherein the patch is dynamically applied each time the client system is re-launched.

13. The method of claim 1 wherein the client application includes a graphic user interface.

14. A system for managing the introduction of a new non-backward compatible version of a software program of an application server into a client/server networking environment, the system comprising:
at least one computer; and
a non-transitory computer readable storage medium comprising program code that, when executed by the at least one computer, causes the system to:
first distribute to a client system to be served by the new non-backward compatible version of the software program of the application server a client application operable in a downgraded mode compatible with a current version of the application server and in a valid mode compatible with the new non-backward compatible version of said software program;
set, upon installation in the client system, the client application into the downgraded mode compatible with the current version of the software program of the application server;
operate the client application in the downgraded mode until introduction of the new non-backward compatible version of the software program of the application server, wherein operating the client application in the downgraded mode includes issuing requests to the application server and receiving requested information from the application server;
set, upon introduction of the new non-backward compatible version of the software program of the application server, the client application into the valid mode compatible with the new version of the software program of the application server; and
thereafter operate the client application in the valid mode, wherein operating the client application in the valid mode includes issuing requests to the application server and receiving requested information from the application server.

15. A computer program product stored on a non-transitory computer readable storage medium, comprising computer readable code means for causing at least one computer to operate the method for managing the introduction of a new non-backward compatible version of a software program of an application server into a client/server networking environment according to claim 1.

16. The method of claim 1 further comprising maintaining the client application in the downgraded mode until re-launch of the client application.

17. The method of claim 1 wherein setting the client application in the downgraded mode and setting the client application in the valid mode are each performed during a launch of the client application, and wherein the client application, once set in one of the downgraded and valid modes, remains in that mode until re-launch of the client application.

18. The method of claim 1 wherein the downgraded and valid modes are mutually exclusive such that the client application operates in only one of the downgraded and valid modes at a time, and such that when the client application is set in the downgraded mode the client application is incompatible with the new non-backward compatible version of the software program of the application server.

19. A method for managing the introduction of a new non-backward compatible version of a software program of an application server into a client/server networking environment, the method comprising:
first distributing to a client system to be served by the new non-backward compatible version of the software program of the application server a client application operable in a downgraded mode compatible with a current version of the application server and in a valid mode compatible with the new non-backward compatible version of said software program, wherein the client application is configured to activate the downgraded mode and deactivate the valid mode upon installation in the client system, wherein the client application is incompatible with the new non-backward compatible version of said software program when in the downgraded mode, and wherein the client application is configured to maintain the active downgraded mode and deactivated valid mode until re-launch of the client application; and
in response to a version request from the client system upon launch of the client application and after installation of the new non-backward compatible version of the software program of the application server on a server system, causing the client application to activate the valid mode and deactivate the downgraded mode such that the client application thereafter operates in the valid mode and is compatible with the new non-backward compatible version of the software program of the application server, wherein the client application is configured to maintain the active valid mode and deactivated downgraded mode until re-launch of the client application.

20. An apparatus, comprising:
at least one computer resident in a client/server networking environment; and
a non-transitory computer readable storage medium comprising program code that, when executed by the at least one computer, causes the system to manage the introduction of a new non-backward compatible version of a software program of an application server by:
first distributing to a client system to be served by the new non-backward compatible version of the software program of the application server a client application operable in a downgraded mode compatible with a current version of the application server and in a valid mode compatible with the new non-backward compatible version of said software program, wherein the client application is configured to activate the downgraded mode and deactivate the valid mode upon installation in the client system, wherein the client application is incompatible with the new non-backward compatible version of said software program when in the downgraded mode, and wherein the client application is configured to maintain the active downgraded mode and deactivated valid mode until re-launch of the client application; and
in response to a version request from the client system upon launch of the client application and after installation of the new non-backward compatible version of the software program of the application server on the server system, causing the client application to activate the valid mode and deactivate the downgraded mode such that the client application thereafter operates in the valid mode and is compatible with the new non-backward compatible version of the software program of the application server, wherein the client application is configured to maintain the active valid mode and deactivated downgraded mode until re-launch of the client application.

* * * * *